United States Patent Office 2,818,437
Patented Dec. 31, 1957

2,818,437

PEROXIDE COMPOUNDS AND METHOD OF PREPARING SAME

Bernard S. Wildi, Dayton, Ohio, and William S. Emerson, Whittier, Calif.

No Drawing. Application August 8, 1956
Serial No. 602,913

6 Claims. (Cl. 260—610)

The present invention is directed to novel bis(aryl-sec-methyl) alkylidene peroxides as represented by the formula:

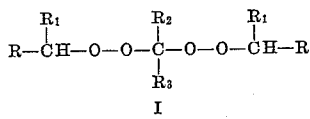

I in which each R is an aryl group, each $R_1$ is an aryl or alkyl group, $R_2$ is hydrogen or a saturated aliphatic group, and $R_3$ is a saturated aliphatic group, or an aryl group. The invention is particularly directed to bis-(diarylmethyl) alkylidene peroxides as represented by the formula:

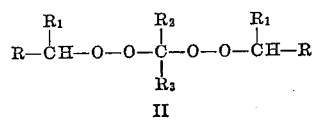

II in which both R and $R_1$ represent mono-cyclic aryl radicals, $R_2$ represents hydrogen or an alkyl radical and $R_3$ represents an alkyl radical or a mono-cyclic aryl radical. When $R_3$ above is alkyl, these compounds can be designated as gem-bis(diarylmethylperoxy) alkanes.

The present invention is also directed to the method of making the above novel compounds in which an aryl methyl secondary hydroperoxide is reacted with an aldehyde or ketone in the presence of an acid catalyst. This reaction can be represented by the equation:

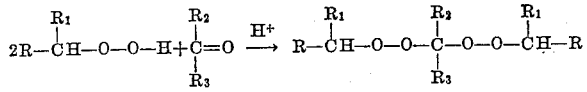

in which the various R's have the same meaning as in Formula I above.

The novel compounds of the present invention are useful as catalysts for various chemical reactions, particularly for the polymerization of polymerizable unsaturated compounds. In the past, ditertiary alkyl peroxy compounds have been used for this purpose. However, the novel bis(1-aryl-sec-hydrocarbon) alkylidene peroxides of the present invention have certain advantages over the prior art compounds in that they are more stable, and produce free radicals of greater stability and longer catalytic life. The novel compounds of the present invention are fairly high melting solids, while many of those of the prior art, e. g., 2,2-bis(tertiary-butylperoxy)-butane, are liquids.

The high stability of the bis-(aryl-sec-methyl) alkylidene peroxides of the present invention makes them particularly useful in high temperature polymerizations in which less stable peroxides would be too readily decomposed.

The greater stability of the free radical catalysts produced by the present novel peroxide compounds may be due in part to the greater number of possible resonance states. For example, 2,2 - bis(diphenylmethylperoxy)-propane is converted to the free radical:

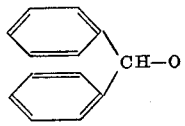

in which each phenyl radical makes two resonance states possible, thereby permitting a total of four resonance states. By contrast, the corresponding tertiary butyl radical has no stabilization by resonance.

The novel compounds of the present invention can be prepared according to the following illustrative examples.

Example 1

Diphenylmethyl hydroperoxide, 5 grams, was dissolved in 50 ml. of acetone and one drop of concentrated sulfuric acid was added. The solution was kept at room temperature for 72 hours. The acetone was removed under water pump vacuum and 200 ml. ethyl ether was added to the residue. The ether solution was extracted with four 25-ml. portions of 5% sodium hydroxide. The ether solution was then washed with water and dried over sodium sulfate. The ether was removed under vacuum, leaving a yellow oil which crystallized after standing 72 hours over phosphorus pentoxide under water pump vacuum. The bis(diphenylmethyl) isopropylidene peroxide crystals, 1.288 grams, melted at 81–87° C. Recrystallization from benzene-hexane solution gave the pure compound, M. P. 86.5–88° C., decomposition point 145° C.

Analysis.—Calc'd for $C_{29}H_{28}O_4$: C, 79.07; H, 6.40. Found: C, 79.33; H, 6.37.

Example 2

Upon replacing the acetone of Example 1 with benzaldehyde, bis(diphenylmethylperoxy) phenylmethane is produced. In place of the procedure of Example 1, a larger amount of acid catalyst can be added, and cooling can be used to control the reaction.

Example 3

1-phenylbutyl hydroperoxide can be reacted with methyl ethyl ketone according to the procedure of Example 1 to produce bis(1-phenylbutyl) sec-butylidene peroxide.

The procedure set forth by way of example above can be modified in various ways. Thus, other acid catalysts can be used, e. g., hydrochloric acid, and organic solvents can be used, e. g., inert hydrocarbon solvents such as hexane. Moreover, it is sometimes advantageous to include various dehydrating agents, e. g., boric anhydride, calcium chloride, phosphorus pentoxide, etc., in the reaction mixture. The temperature during the reaction can be varied considerably, e. g., from about −10° C. to about 40° C. The carbonyl compound is preferably present in molar excess during the reaction despite the fact that the product requires two moles of the hydroperoxide reactant per mole of the carbonyl reactant; of course, lesser amounts of the carbonyl compound can be used, particularly if an inert organic solvent is present. The reaction time can vary widely, e. g., from a few hours to 100 hours, depending upon the reaction conditions.

The process of the present invention can be applied to various other aryl secondary hydroperoxides, e. g., di-p-methylphenylmethyl hydroperoxide, di-m-butylphenylmethyl hydroperoxide, di-p-chlorophenylmethyl hydroperoxide, di-p-nitrophenylmethyl hydroperoxide, 1-phenylbutyl hydroperoxide, 1-phenyl-2-methylpropyl hydroperoxide, di-o-methyl-p-ethylphenylmethyl hydroperoxide. It is preferred that the aryl groups be mono-nuclear, i. e., phenyl groups, and that they have no substituents other than aliphatic hydrocarbon groups of 1 to 6 carbon atoms, e. g., such lower alkyl groups as methyl, ethyl, propyl, isopropyl, n-butyl, isobutyl, t-butyl, pentyl, hexyl, etc.

The above-mentioned hydroperoxides can be reacted with organic carbonyl compounds, particularly saturated aliphatic and alicyclic aldehydes and ketones, e. g., acetone, methyl ethyl ketone, diethyl ketone, methyl n-propyl ketone, methyl isopropyl ketone, methyl n-butyl ketone, methyl isobutyl ketone, ethyl n-propyl ketone, ethyl isopropyl ketone, acetaldehyde, propionaldehyde, butyraldehyde, isobutyraldehyde, methyl ethyl acetaldehyde, heptaldehyde, caprylic aldehyde, etc. In addition, dicarbonyl compounds, such as acetyl acetone can be employed. As alicyclic ketones, such compounds as cyclopentanone, cyclohexanone, and various substituted derivatives thereof are applicable. Aromatic compounds containing a carbonyl group can also be used, e. g., benzaldehyde, n-hydroxybenzaldehyde, salicylaldehyde, and phenylacetaldehyde. It is preferred that the carbonyl compounds contain no polar group other than the carbonyl group.

Any of the above-mentioned carbonyl compounds can be reacted with any of the above-mentioned hydroperoxides to produce the novel bis(1-aryl-sec-hydrocarbon) alkylidene peroxides of the present invention. The novel peroxides will correspond to Formula I or II hereinabove, the various R's of the formulae representing the corresponding groups from the hydroperoxides and the carbonyl compounds. A few examples of these novel peroxides are bis(di-p-methylphenylmethyl) isopropylidene peroxide, bis(di-p-chlorophenylmethyl) sec-butylidene peroxide, bis(1-phenylbutyl) ethylidene peroxide, bis(1-phenyl-2-methylpropylperoxy)-phenylmethane, 3,3-bis(diphenylmethylperoxy) - pentane, 1,1 - bis(diphenylmethylperoxy)-cyclohexane, bis(diphenylmethyl) isopropylidene peroxide, bis(1-phenylbutyl) sec-butylidene peroxide, bis(diphenylmethyl) sec-butylidene peroxide, etc.

Prior workers have reacted tertiary alkyl hydroperoxides with aldehydes and ketones to prepare di-tertiary alkyl alkylidene peroxides. However, to the best of our knowledge the reaction of aryl secondry hydroperoxides with aldehydes and ketones to prepare bis(1-aryl-sec-hydrocarbon) alkylidene peroxides has not been heretofore attempted.

As stated hereinbefore, the novel peroxide compounds of the present invention are useful as polymerization catalysts. For example, the compounds are useful in the polymerization of various vinyl monomers, such as vinyl chloride or styrene, in the massive state or dispersed in a suitable medium, at temperatures of the order of 150 to 200° C. The novel peroxides are also useful in the polymerization of conjugated dienes, e. g., butadiene-1,3, isoprene, etc.

Novel bis(1-aryl-sec-hydrocarbon) alkylidene peroxides and a method of preparing these compounds by reacting an aryl secondary hydroperoxide with an organic carbonyl compound in the presence of an acid catalyst have been described.

We claim:

1. As new compounds, the bis(aryl-sec-methyl) alkylidene peroxides represented by the formula

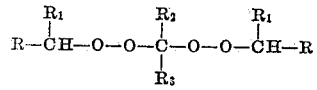

in which each R represents an aryl group, $R_1$ is selected from the class consisting of aryl and alkyl groups, $R_2$ is selected from the class consisting of hydrogen and saturated aliphatic groups, and $R_3$ is selected from the group consisting of saturated aliphatic groups and aryl groups and which are hydrocarbon except for the peroxide structure and in which all aryl groups are monocyclic and have no substituents other than aliphatic groups of 1 to 6 carbon atoms and in which

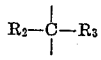

contains no more than 8 carbon atoms.

2. As new compounds, bis(diarylmethyl) alkylidene peroxides in which all aryl groups are monocylic hydrocarbons and have no substituents other than aliphatic groups of 1 to 6 carbon atoms and in which the alkylidene group is a hydrocarbon of 2 to 8 carbon atoms.

3. As new compounds, gem - bis(diphenylmethylperoxy) alkanes in which the alkane group is a hydrocarbon of 2 to 8 carbon atoms.

4. As a new compound, bis(diphenylmethyl) isopropylidene peroxide.

5. A method of making bis(aryl-sec-methyl) alkylidene peroxides which comprises reacting an arylmethyl secondary hydroperoxide in which aryl is limited to monocyclic aryl hydrocarbons containing no substituents other than aliphatic hydrocarbons of 1 to 6 carbons atoms with an organic carbonyl compound which is hydrocarbon except for carbonyl structure and which contains 2 to 8 carbon atoms in the presence of an acid catalyst.

6. A method of preparing bis(diphenylmethyl) isopropylidene peroxide which comprises contacting diphenylmethyl hydroperoxide with a stoichiometric excess of acetone at a temperature of from −10 to 40° C., and in the presence of an acid catalyst to produce bis(diphenylmethyl) isopropylidene peroxide.

References Cited in the file of this patent

UNITED STATES PATENTS 2,455,569    Dickey _____ Dec. 7, 1948